(12) United States Patent
Sashihara

(10) Patent No.: US 6,917,606 B2
(45) Date of Patent: Jul. 12, 2005

(54) PRIORITY DATA TRANSFER METHOD

(75) Inventor: Toshiyuki Sashihara, Tokyo (JP)

(73) Assignee: NEC Corporation, Tokyo (JP)

( * ) Notice: Subject to any disclaimer, the term of this patent is extended or adjusted under 35 U.S.C. 154(b) by 804 days.

(21) Appl. No.: 09/814,097

(22) Filed: Mar. 22, 2001

(65) Prior Publication Data
US 2003/0189948 A1 Oct. 9, 2003

(30) Foreign Application Priority Data

Mar. 23, 2000 (JP) .......................................... 2000-087060

(51) Int. Cl.$^7$ ............................................... H04Q 7/24
(52) U.S. Cl. ....................................... 370/338; 370/445
(58) Field of Search ................................. 370/252, 310, 370/338, 400–403, 445–8, 458, 469, 351–353, 474, 230

(56) References Cited

U.S. PATENT DOCUMENTS

| 6,212,164 B1 | 4/2001 | Murakami et al. | |
|---|---|---|---|
| 2003/0206559 A1 * | 11/2003 | Trachewsky et al. | 370/509 |
| 2004/0073933 A1 * | 4/2004 | Gollnick et al. | 725/81 |

FOREIGN PATENT DOCUMENTS

| JP | 59-91527 | 5/1984 |
|---|---|---|
| JP | 59-204347 | 11/1984 |
| JP | 5-128059 | 5/1993 |
| JP | 9-312668 | 12/1997 |
| JP | 10-229405 | 8/1998 |
| JP | 11-234286 | 8/1999 |
| JP | 2001-119331 | 4/2001 |

* cited by examiner

Primary Examiner—David Vincent
(74) Attorney, Agent, or Firm—Foley & Lardner LLP

(57) ABSTRACT

When a send packet from a slave station and a send packet from a relay station are simultaneously sent to other relay station, the collision of the send packets against each other is detected, and the backoff time of the collided packet is calculated based on the hop count recorded in a hop count recording field of the collided packet. Therefore, the backoff time is set so that the backoff time decreases with increasing the hop count. This increases the probability of resending of the packet without collision with other packet in the resending processing, and enables the packet having a larger hop count to be preferentially sent. By virtue of this construction, a priority data transfer method can be realized which, when collision of a packet against other packet has occurred, performs resend processing based on the priority level of the packet.

26 Claims, 8 Drawing Sheets

LEADING SIGNAL

TRAILING SIGNAL

PRIORITY DATA TRANSFER METHOD

FIELD OF THE INVENTION

The invention relates to a priority data transfer method, and more particularly to a priority data transfer method in a communication system wherein, when data collision has occurred in random access control, the collided data is resent based on the priority level of the data.

BACKGROUND OF THE INVENTION

When a plurality of packet senders are present in an identical packet transmission line as in cable or wireless LAN, the send of packets in the same timing sometimes causes collision of the packets against each other. The collision of data (packets) against each other results in breaking of send data, or otherwise makes it impossible to guarantee the quality of send data. In order to overcome this problem, for example, the following method has hitherto been used to avoid the collision of data.

CSMA/CD (carrier sense multiple access with collision detections is known as a method for detecting the collision of data and controlling and managing data. According to this method, prior to transmission of data, CS (carrier sense) is performed to detect carriers on the transmission line, and, when, upon the send of data, the data has collided against other data on the transmission line, CD (collision detection) is performed to detect a collision signal. Upon the detection of the collision signal, terminal units, which have sent the collided data, resend the respective data after standby, i.e., after the elapse of random times generated by the respective terminal units. According to this CSMA/CD method, the random time is determined by a calculation method, which can logarithmically reduce the probability of collision, so as not to cause collision again.

Another method is ICMA/PE (idle-signal casting multiple access with partial echo). The idle/occupy of a leading channel has been indicated by idle line/inhibit bit, and the receive/non-receive due to collision has been indicated by collision detection indication bit. By contrast, according to this method, in addition, send data subjected to certain processing is folded back as a partial echo to the trailing collision control bit, and, thus, sending can be confirmed frame by frame.

For example, Japanese Patent Laid-Open No. 128059/1993 discloses a priority data transfer method wherein the backoff time is determined in such a manner that, based on whether collided packets are usual data or priority data, priority data is judged, and the packet judged to be priority data is preferentially resent.

FIG. 13 is a schematic block diagram showing a conventional priority data transfer method.

According to the conventional priority data transfer method shown in FIG. 13, a communication unit 1310 is connected to a communication unit 1320 through a bus 1330. The communication unit 1310 comprises a collision detector 1311, a resend time generation section 1312, a priority data judging section 1313, and a random number generation section 1314. The communication unit 2 has the same construction as the communication unit 3.

In this conventional priority data transfer method, as soon as the collision detector 1311 has detected that collision on the bus 1330 continuously occurred a predetermined number of times, the collision detector 1311 requests the resend time generation section 1312 to generate a send data resend time of the data, which could not have been sent due to the collision on the bus 1330, and, in addition, requests the priority data judging section 1313 to judge the priority of the send date, which could not have been sent due to the collision on the bus 1330.

The resend time generation section 1312 requests the random number generation section 1314 to generate a random number, and generates a resend time of the send data corresponding to the random number generated in the random number generation section 1314.

The priority data judging section 1313 checks the priority of the send data requested by the collision detector 1311 to judge whether the requested send data is ordinary data or priority data, and informs the resend time generation section 1312 of the result.

In the conventional priority data transfer method, however, judgment processing in the priority data judging section for judging whether or not the collided data is priority data is not embodied.

Further, the conventional priority data transfer method is used for avoiding the collision of data between communication units connected to each other through a bus (a cable), and no mention is made to radio communication.

SUMMARY OF THE INVENTION

In view of the above problems of the prior art, the invention has been made, and it is an object of the invention to provide a priority data transfer method wherein, when the collision of packets has occurred on a bus, the collided packet is resent based on the priority of the packet.

More specifically, the object of the invention is to provide a priority data transfer method which, in random access control, such as CSMA/CD or ICMA/PE, judges whether or not the collided packet is priority data, and, when the packet has been judged to be priority data, calculates the resend time (backoff time) of the packet based on the priority, and preferentially sends this packet.

In order to attain the above object, according to the first feature of the invention, a priority data transfer method comprises the steps of: determining the stepwise priority level of collided packet; and resending the collided packet based on the priority level.

According to the second feature of the invention, a priority data transfer method for a communication system using random access control comprises the steps of:

detecting collision of a send packet against other packet on a transmission line (a collision detection step);

upon the detection of the collision of the packet against other packet in the collision detection step, generating a random number (a random number generation step);

judging the priority level of the send packet (a priority level judging step);

generating a delay time, which elapses until the send packet is resent, based on the random number generated in the random number generation step and the priority level of the send packet judged in the priority level judging step (a delay time generation step); and resending the packet after the elapse of the delay time generated in the delay time generation step.

In the priority data transfer method according to the second feature of the invention, preferably, a hop count recording field for recording a hop count as a measure of the priority level of the send packet is provided in the send packet; and in judging the send packet priority level in the priority level judging step, the priority level of the send packet is judged based on the hop count recorded in the hop count recording field.

In this case, preferably, in the delay time generation step, the random number generated in the random number generation step is multiplied by a value obtained by subtracting a value proportional to the hop count from 1 (one) to generate the delay time, and the packet having a larger hop count recorded in the hop count recording field is preferentially sent.

In the priority data transfer method according to the second feature of the invention, preferably, a priority value recording field for recording a priority value as a measure of the priority level of the send packet is provided in the send packet; and in judging the send packet priority level in the priority level judging step, the priority level of the send packet is judged based on the priority value recorded in the priority value recording field.

In this case, preferably, in the delay time generation step, the random number generated in the random number generation step is multiplied by a value proportional to the priority value of the send packet to generate the delay time, and the packet having a higher priority level recorded in the priority value recording field is preferentially sent.

In the above embodiments of the priority data transfer method according to the second feature of the invention, a construction may be adopted such that the priority level of the send packet increases with decreasing the priority value.

In the priority data transfer method according to the second feature of the invention, preferably, the send packet has a send data length recording field for recording the length of send data as a measure of the priority level of the send packet, and a continued data recording field for indicating whether continued data of the send packet is present or absent, and in judging the send packet priority level in the priority level judging step, the priority level of the send packet is judged based on the send data length and the continued data.

In this case, preferably, in the delay time generation step, the random number generated in the random number generation step is multiplied by a value obtained by subtracting a value proportional to the data size from 1 (one), and, when the continued data is present, in addition, the obtained value is multiplied by a predetermined value to generate a delay time, and the packet having a larger data size recorded in the send data length recording field is preferentially sent, and when the data size is identical, the packet, wherein continued data is present in the continued data recording field, is preferentially sent.

In the priority data transfer method according to the second feature of the invention, preferably, the send packet has a hop count recording field for recording a hop count as a measure of the priority level of the send packet, and a priority value recording field for recording a priority value as a measure of the priority level of the send packet, and in judging the send packet priority level in the priority level judging step, the priority level of the send packet is judged based on the hop count and the priority value.

In this case, preferably, in the delay time generation step, the random number generated in the random number generation step is multiplied by a value proportional to the priority value and then by a value obtained by subtracting a value proportional to the hop count from 1 (one), whereby the delay time is generated, and the packet having a higher priority level and the packet having a larger hop count are preferentially sent.

In these two above embodiments of the priority data transfer method according to the second feature of the invention, the priority level of the send packet increases with decreasing the priority value.

In the priority data transfer methods according to the first and second features of the invention, the communication system is a radio communication system.

According to the invention, in random access control, such as ICMA/PE or CSMA/CD, judgment is made on whether or not the collided packet is priority data, and the resend time of the packet is determined based on the priority information and a random number, followed by preferential resending of the priority packet.

BRIEF DESCRIPTION OF THE DRAWINGS

The invention will be explained in more detail in conjunction with the appended drawings, wherein.

DESCRIPTION OF THE PREFERRED EMBODIMENTS

Preferred embodiments of the priority data transfer method according to the invention will be explained in more detail in conjunction with the accompanying drawings. FIGS. 1 to 12 show preferred embodiments of the priority data transfer method according to the invention.

Figure 1:
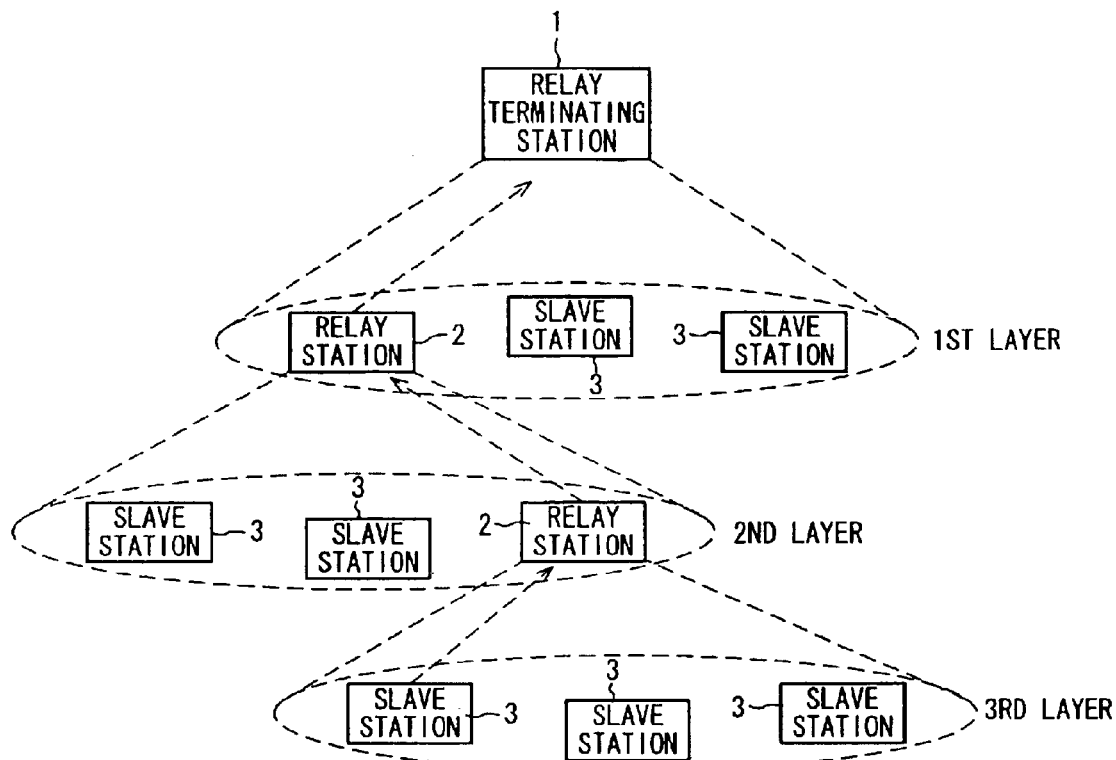
FIG. 1 is a diagram showing the construction of a network to which a preferred embodiment of the priority data transfer method according to the invention has been applied.

FIG. 1 is a schematic diagram showing the construction of a communication system to which a preferred embodiment of the priority data transfer method according to the invention has been applied. The communication system shown in FIG. 1 comprises a relay terminating station 1, a plurality of relay stations 2, and a plurality of slave stations 3. Unique IDs (identification numbers) are assigned respectively to the stations.

The relay terminating station 1 has the function of storing data sent from the relay stations 2 and the slave stations 3.

For the slave stations 3 present in an area (cell) at which radio waves from the relay terminating station 1 do not reach, the relay station 2 sends data of the relay stations 2 and the slave stations 3 located within the cell covered by the relay station 2 to the relay terminating station 1 or a higher rank relay station 2.

The slave station 3 is, for example, a telemeter, and functions to send data to the relay terminating station 1 and the relay station 2.

In FIG. 1, when the distance (hop count) in the sense of the graph theory from nodes of the individual relay stations 2 and slave stations 3 to the node of the relay terminating station 1 is 1, this layer is a first layer, while, when the hop count is 2, the layer is a second layer. Thus, as shown in the drawing, the relay terminating station 1, the relay stations 2, and the slave stations 3 constitute a network having a hierarchical structure with the relay terminating station 1 being at the apex.

In this communication system, communication between the higher rank layer and the lower rank layer is performed by wireless communication. A plurality of the relay stations 2 and the slave stations 3 located in the lower rank layer share an identical radio channel to perform communication with the higher rank layer. Here the channel refers to, for example, TDMA (time division multiple access). Therefore, when a plurality of stations simultaneously send packets, the collision of packets takes place. The present preferred embodiment will be explained on the premise that this collision is detected by ICMA/PE.

Figure 2A:
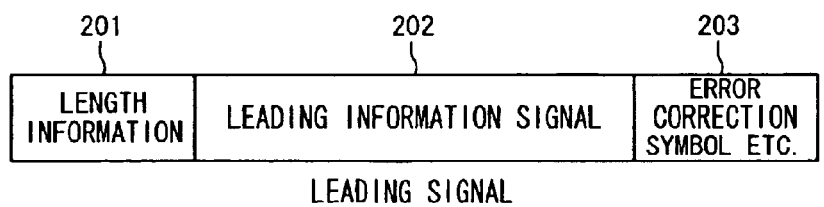
FIGS. 2A and 2B are diagrams showing the construction of leading/trailing packets in ICMA/PE according to a preferred embodiment of the priority data transfer method of the invention.
Figure 2B:
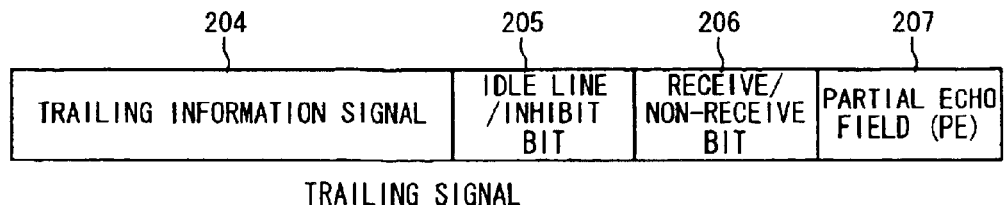

FIG. 2 is a general diagram showing the construction of leading/trailing packet signals in ICMA/PE according to a preferred embodiment of the priority data transfer method of the invention.

In FIG. 2, regarding a leading packet signal (a), send data is divided into units having a given length, and each unit comprises length information 201, a leading information signal 202, an error correction signal 203 and the like. The remaining unit number is added to the head of each unit information, and, in this state, data is sent.

A trailing packet signal (b) is reported, with a trailing information signal 204 being added thereto, in correspondence to the leading information unit, and comprises an idle line/inhibit indication bit 205, a receive/non-receive bit 206, and a partial echo (PE) field 207.

When there is data being received, the idle line/inhibit bit 205 indicates "inhibit" and inhibits access from other mobile stations. The receive/non-receive indication bit 206 indicates "receive" in the case of proper reception of an error signal, and indicates "non-receive" in the case of the presence of an uncorrectable error or in the case of a signal unreceived state. When "non-receive" is indicated during signal transmission, the mobile station, which is sending data packet, temporarily stops to send information, and begins a resend procedure. The partial echo field 207 is used for a display mobile station to check a part of the received data against this information to judge whether or not the information sent by its own station is properly received.

Figure 3:
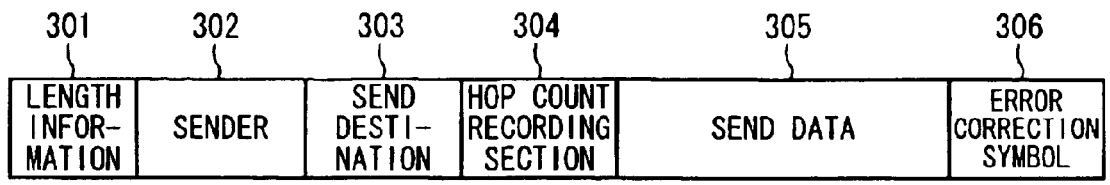
FIG. 3 is a diagram showing the construction of a leading transmission packet among a relay terminating station, a relay station, and a slave station according to a preferred embodiment of the invention.

FIG. 3 is a diagram showing the construction of a packet used as a leading send packet among the relay terminating station, the relay stations, and the slave stations in a preferred embodiment of the priority data transfer method according to the invention.

In FIG. 3, the leading send packet comprises length information 301, a sender 302, a send destination 303, a hop count recording section 304, a send data 305, and an error correction symbol 306.

The length information 301 represents the number of remaining packets to be sent. The sender 302 is used for identifying the sender of the packet, and stores the ID number of the packet sender. The send destination 303 designates the send destination of the packet, and stores the packet send destination ID number. The hop count recording section 304 is a section for storing the hop count of this packet. When the packet is initially sent, "1" is stored. Thereafter, every time when the packet is relayed, "1" is added. The send data 305 is a section for storing send data. The error correction symbol 306 is a symbol for detecting and correcting a receive error of this packet.

Figure 4:
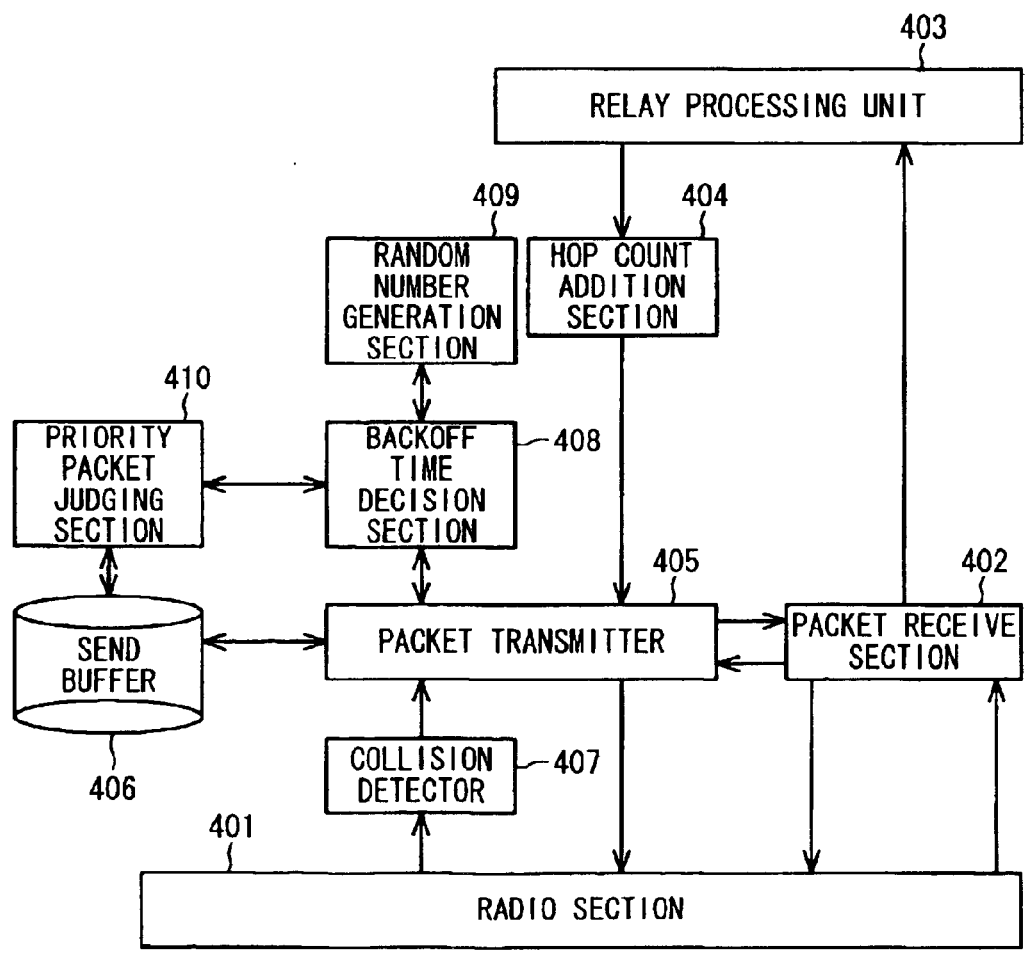
FIG. 4 is a block diagram showing the internal construction of a relay station according to the first embodiment of the invention.

FIG. 4 is a block diagram showing the internal construction of a relay station in a preferred embodiment of the invention. In FIG. 4, the relay station in the preferred embodiment of the invention comprises a radio section 401, a packet receive section 402, a relay processing unit 403, a hop count addition section 404, a packet transmitter 405, a send buffer 406, a collision detector 407, a backoff time decision section 408, a random number generation section 409, and a priority packet judging section 410.

The radio section 401 performs wireless packet send/receive through an antenna (not shown).

The packet receive section 402 is a section for receiving packets through the radio section 401.

The relay processing unit 403 functions to send the packet received by the packet receive section 402 to a next send destination.

The hop count addition section 404 functions to add "1" to the hop count recorded in the hop count recording section described below and to write the result in the same place.

The packet transmitter 405 asks the packet receive section 402 about higher rank state (idle line/inhibit), and, in the case of an idle state, sends the packet, sent from the hop count addition section 404, through the radio section 401 and, at the same time, stores the sent packet in the send buffer 406.

Further, the packet transmitter 405 has the function of acquiring the number of resends of the packet from the send buffer 406, adding "1" to the number of resends, and again writing the result in the send buffer 406.

The send buffer 406 is an area for temporarily storing the sent packet and the number of resends of the packet.

The collision detector 407 is a section for determining whether or not the packet sent through the radio section 401 has collided against other send packet.

The backoff time decision section 408 determines the backoff time in resend processing of the collided packet based on information from the random number generation section 409 described below and information from the priority packet judging section 410.

The random number generation section 409, upon the request from the backoff time decision section 408, generates a random number in a certain predetermined range, and transfers the generated random number to the backoff time decision section 408.

The priority packet judging section 410 fetches the sent packet, from the send buffer 406, examines the priority level of the packet, and sends the result to the backoff time decision section 408.

Figure 5:
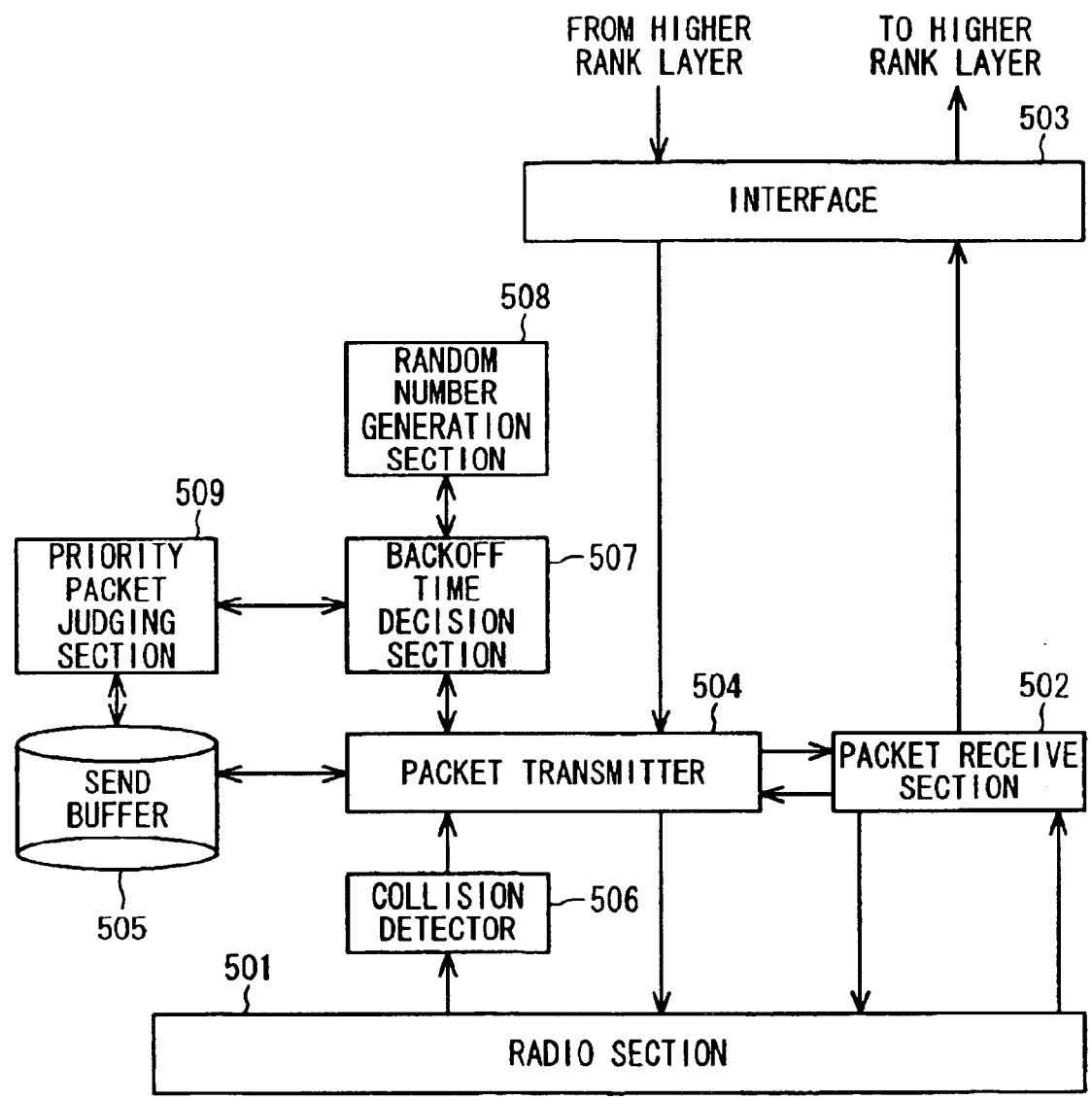
FIG. 5 is a block diagram showing the internal construction of a slave station according to the first embodiment of the invention.

FIG. 5 is a block diagram showing the internal construction of a relay terminating station and slave stations in a preferred embodiment of the invention. In FIG. 5, the relay terminating station and the slave stations in a preferred embodiment of the invention each comprise a radio section 501, a packet receive section 502, an interface 503, a packet transmitter 504, a send buffer 505, a collision detector 506, a backoff time decision section 507, a random number generation section 508, and a priority packet judging section 509.

The radio section 501 performs wireless packet send/receive through an antenna (not shown).

The packet receive section 502 is a section for receiving packets through the radio section 501.

The interface 503, upon the receipt of the packet received in the packet receive section 502, and selects the data portion from the packet which is then transferred to a higher rank layer in an OPI (open system interconnection) hierarchy. Further, the interface 503, when requested from a higher rank layer to send data, packets the data, and transfers the packet to the packet transmitter 504.

The packet transmitter 504 asks the packet receive section 502 about higher rank state (idle line/inhibit), and, in the case of an idle state, sends the packet, sent from the hop count addition section 504, through the radio section 501 and, at the same time, stores the sent packet in the send buffer 505.

Further, the packet transmitter 504 has the function of acquiring the number of resends of the packet from the send buffer 505, adding "1" to the number of resends, and again writing the result in the send buffer 505.

The send buffer 505 is an area for temporarily storing the sent packet and the number of resends of the packet.

The collision detector 506 is a section for determining whether or not the packet sent through the radio section 501 has collided against other send packet.

The backoff time decision section 507 determines the backoff time in resend processing of the collided packet based on information from the random number generation section 508 described below and information from the priority packet judging section 509.

The random number generation section 508, upon the request from the backoff time decision section 507, generates a random number in a certain predetermined range, and transfers the generated random number to the backoff time decision section 507.

The priority packet judging section 509 fetches the sent packet, from the send buffer 505, examines the priority level of the packet, and sends the result to the backoff time decision section 507.

Figure 6:
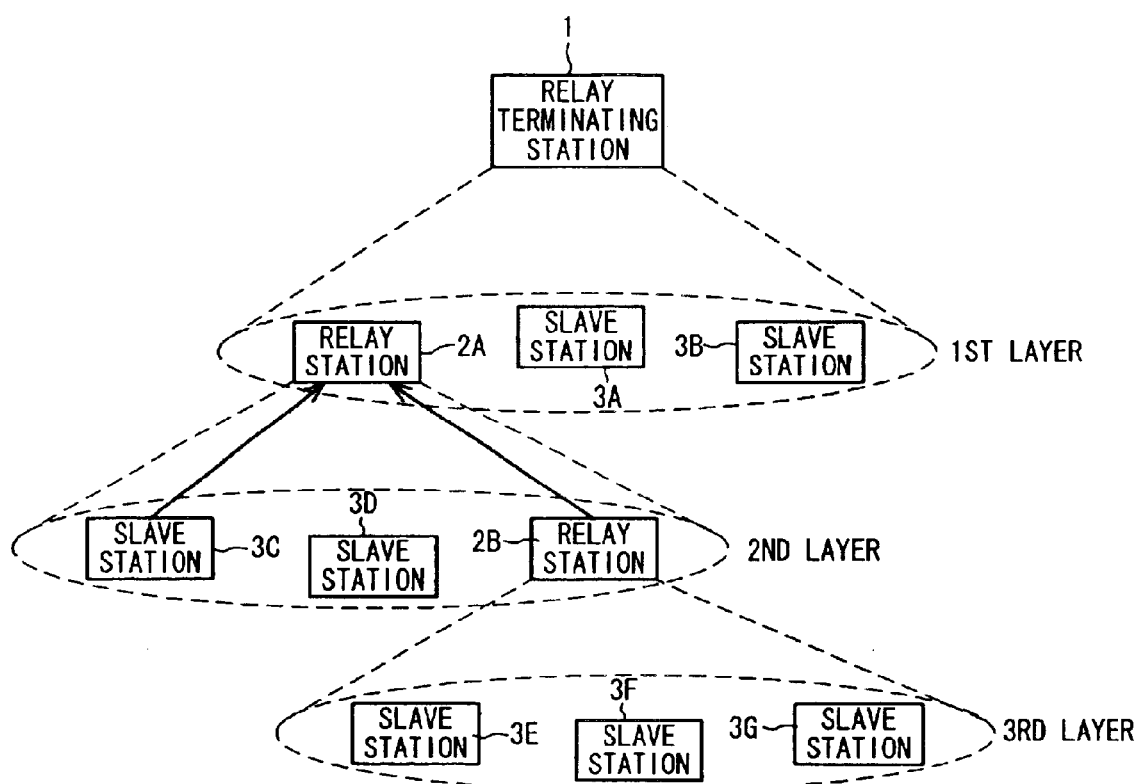
FIG. 6 is a conceptual diagram illustrating the collision of send packets in a communication system to which the priority data transfer method according to the first preferred embodiment of the invention has been applied.

FIG. 6 is a conceptual diagram illustrating the collision of send packets in a communication system to which the priority data transfer method according to a preferred embodiment of the invention has been applied.

FIG. 6 shows the case where a send packet from a slave station 3C and a send packet from a relay station 2B are simultaneously sent to a relay station 2A. An example of the operation of each station will be explained in conjunction with FIGS. 7 and 8.

(First Preferred Embodiment)

Figure 7:
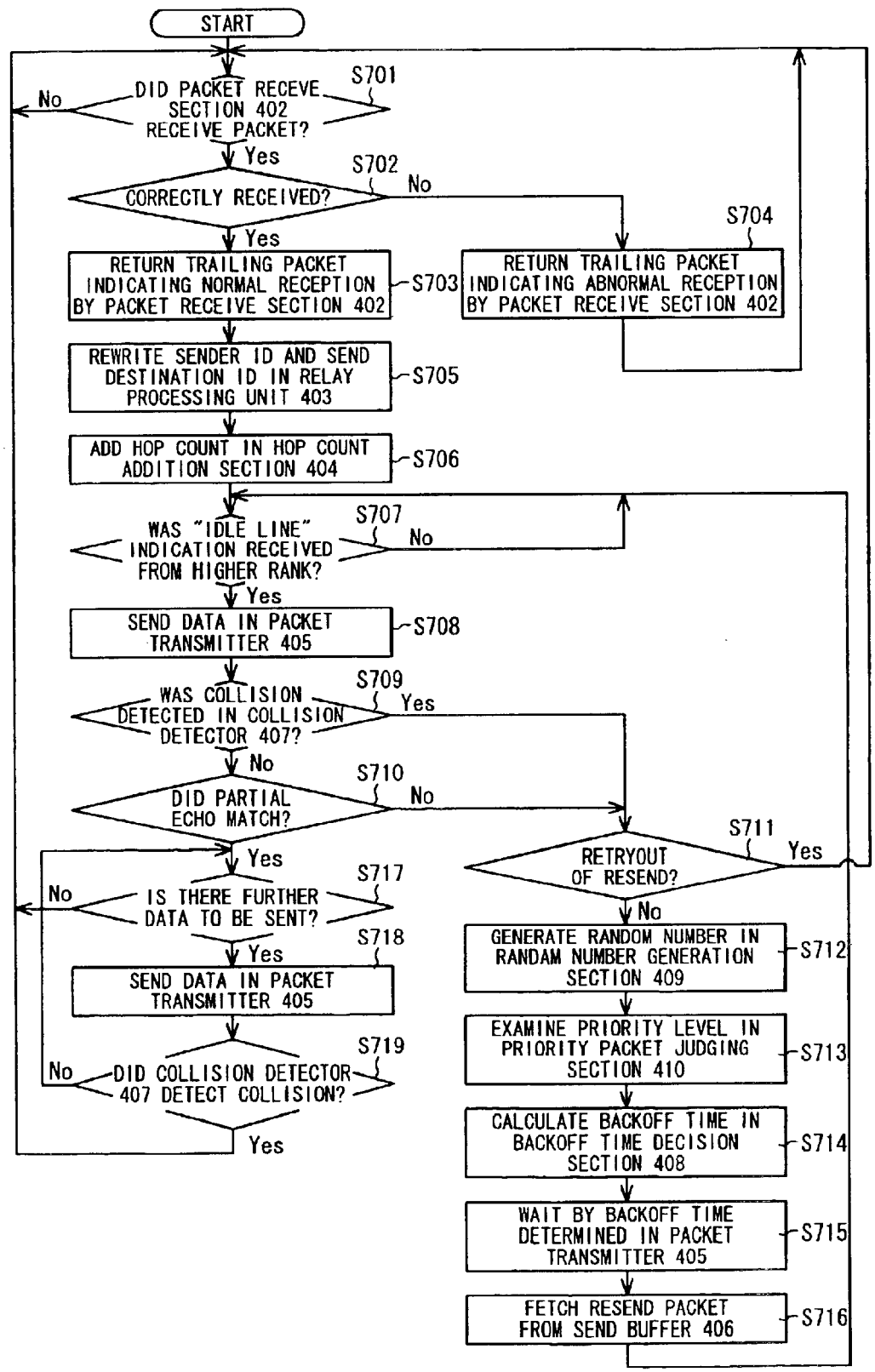
FIG. 7 is a flow chart showing an example of the operation of a relay station in the first preferred embodiment of the invention.

FIG. 7 is a flow chart showing an example of the operation of a relay station in the first preferred embodiment of the invention. In FIG. 7, a relay station 2B judges at a certain time t1 whether or not data has been received through the radio section 401 from any of slave stations 3E to 3G (step S701). Here when judgment is such that data has not been received (step S701/NO), receive processing in the radio section 401 is continued.

On the other hand, in step S701, when there is data received through the radio section 401 (step S701/YES), whether or not the packet has been properly received is judged (step S702). When the packet has not been properly received (step S702/NO), a trailing packet indicating abnormal receive is transferred through the packet receive section 402 to the radio section 401, followed by send of the packet (step S704).

In step S702, when it has been confirmed that the packet was properly received (step S702/YES), a trailing packet indicating normal receive is transferred through the packet receive section 402 to the radio section 401, followed by send of the packet (step S703).

In the relay processing unit 403, the sender 302 and the send destination 303 in the properly received packet are rewritten respectively to ID of the relay processing unit per se and ID of a relay station 2A to which the packet is to be sent next (step S705). Thereafter, addition processing of a hop counter is performed in an after-hop count addition section 404 (step S706). In the addition processing of the hop counter in the hop count addition section 404, a value obtained by adding "1" to the value of the hop count recording section 304 is written in the same place, followed by transfer of the packet to the packet transmitter 405.

The packet transmitter 405 asks the packet receive section 402 about higher rank state (idle line/inhibit) (step S707), and, when "idle line" indication has been received from the higher rank (that is, in the case of an idle state), transfers the packet, received from the hop count addition section 404, to the packet transmitter 405 and then to the radio section 401, followed by send to the relay station 2A (step S708). The time at this point is t2.

Next, the collision detector 407 judges whether or not collision has occurred at the time of sending (step S709). Here when collision has not been detected by the collision detector 407 (step S709/NO), judgment is made on whether or not the partial echo stored in the partial echo field matches (step S710).

In step S710, when the judged partial echo has matched (step S710/YES), judgment is made on whether or not there is further data to be sent (step S717).

In step S717, when judgment is such that there is further data to be sent (step S717/YES), the data is sent through the packet transmitter 405 (step S718), and the detection of the collision of the sent data is performed in the collision detector 207 (step S719). Here when the result of the detection is such that there is no collision (step S719/NO), processing is returned to step S717. On the other hand, when the result of the detection is such that there is collision (step S719/YES), processing is transferred to step S701.

In step S709, when the result of the detection of collision in the collision detector 407 is such that there is collision (step S709/YES), or when the result of the judgment in step S710 is such that the partial echo does not match (step S710/NO), the relay station 2B informs the packet transmitter 405 of the fact that the collision has been detected. Upon the receipt of the notification, the packet transmitter 405 fetches information on the number of resends of the collided packet from the send buffer 406 to confirm whether or not the recycle is over, that is, to perform retryout of resend (step S711).

In step S711, when the result of judgment is such that the recycle of the collided packet is over (step S711/YES), the send of this packet is regarded as having failed, followed by transfer to processing in step S701.

On the other hand, when the result of judgment in step S711 is such that the recycle of the collided packet is not over (step S711/NO), a request is made to the backoff time decision section 408 for the determination of the backoff time, and the backoff time decision section 408 asks the random number generation section 409 to generate a random number (step S712), and asks the priority packet judging section 410 to examine the priority level of the collided packet (step S713).

Upon the receipt of the request, the random number generation section 409 informs the backoff time decision section 408 of the generated random number, and the priority packet judging section 410 informs the backoff time decision section 408 of the result of the examination on the priority level of the packet.

The backoff time decision section 408 calculates the backoff time based on the notice of the random number and the result of the examination of the priority level of the packet (step S714), and informs the packet transmitter 405 of the determined backoff time.

The packet transmitter 405 waits the send of packet by the notified backoff time (step S715).

Upon the completion of the standby by the backoff time in step S715, the packet transmitter 405 acquires the packet to be resent from the send buffer 406 (step S716), followed by transfer to processing in step S707.

Figure 8:
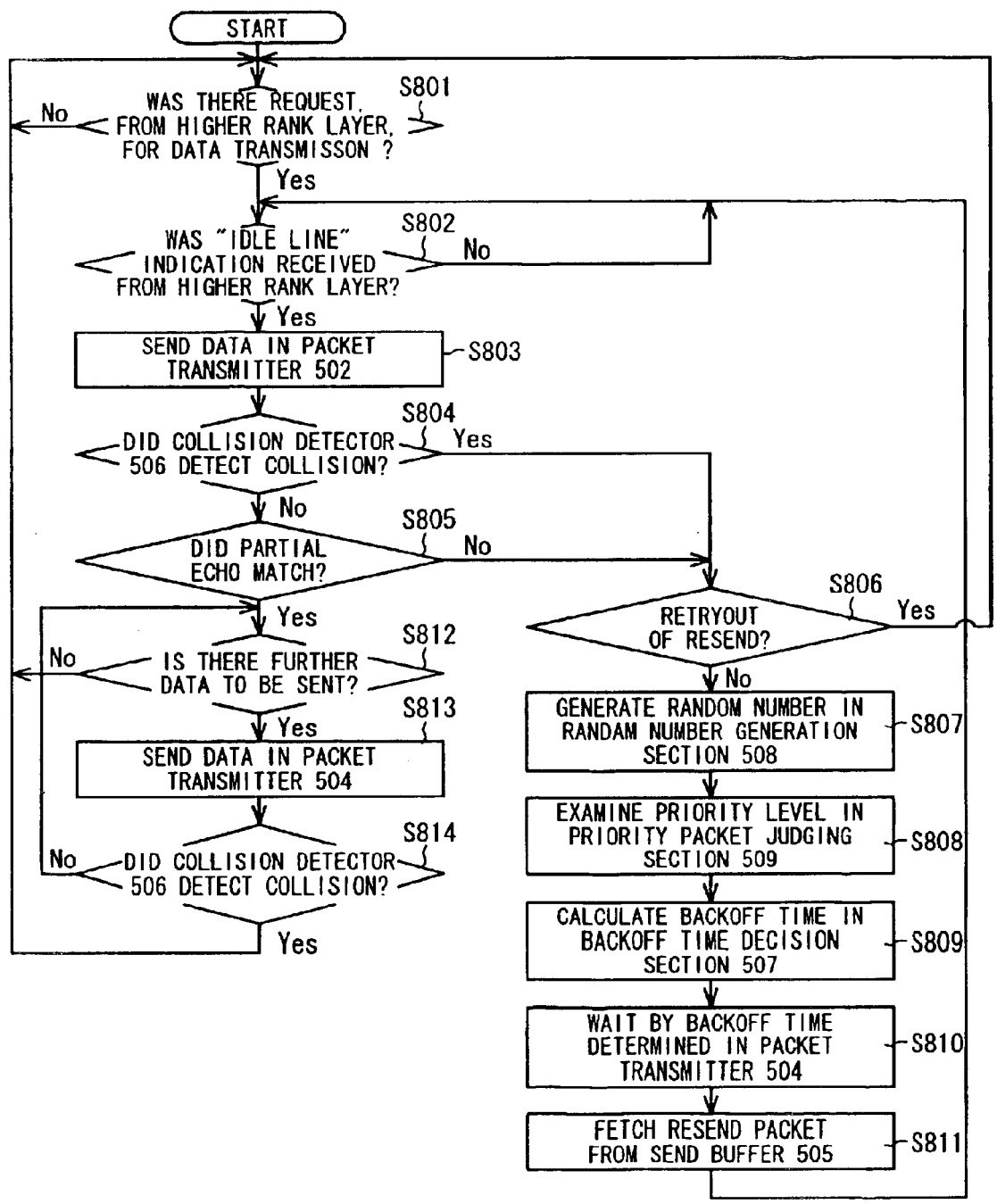
FIG. 8 is a flow chart showing an example of the operation of a slave station in the first preferred embodiment of the invention.

FIG. 8 is a flow chart showing an example of the operation of a slave station in the first preferred embodiment of the invention. In FIG. 8, a slave station 3C judges whether or not, in the interface 503, there is a demand (a request) for the send of data from a higher rank layer in the OSI reference model (step S801). Here when the result of judgment is such that there is a demand (a request) for the send of data (step S801/YES), the packet transmitter 504 asks the packet receive section 502 about higher rank state (idle line/inhibit) (step S802), and, when "idle line" indication has been received from the higher rank (in the case of an idle state), sends the packet, received from the interface 503, through the radio section 501 (step S803).

Next, the collision detector 506 judges through the detection procedure whether or not collision has occurred at the time of sending (step S804). Here when the result of judgment by the collision detector 506 is such that the collision has not occurred (step S804/NO), judgment is made on whether or not the partial echo stored in the partial echo field matches (step S805).

In step S805, when the judged partial echo has matched (step S805/YES), judgment is made on whether or not there is further data to be sent (step S812).

In step S812, when judgment is such that there is further data to be sent (step S812/YES), the data is sent through the packet transmitter 504 (step S813), and the detection of the collision of the sent data is performed in the collision detector 506 (step S814). Here when the result of detection is such that there is no collision (step S814/NO), processing is returned to step S812. On the other hand, when the result of the detection is such that there is collision (step S814/YES), processing is transferred to step S801.

In step S804, when the result of the detection of collision in the collision detector 506 is such that there is collision (step S804/YES), or when the result of the judgment in step S805 is such that the partial echo does not match (step S805/NO), the slave station 3C informs the packet transmitter 504 of the fact that the collision has been detected. Upon the receipt of the notification, the packet-transmitter 504 fetches information on the number of resends of the collided packet from the send buffer 505 to confirm whether or not the recycle is over, that is, to perform retryout of resend (step S806).

In step S806, when the result of judgment is such that the recycle of the collided packet is over (step S806/YES), the send of this packet is regarded as having failed, followed by transfer to processing in step S801.

On the other hand, when the result of judgment in step S806 is such that the recycle of the collided packet is not over (step S806/NO), a request is made to the backoff time decision section 507 for the determination of the backoff time, and the backoff time decision section 507 asks the random number generation section 508 to generate a random number (step S807), and asks the priority packet judging section 509 to examine the priority level of the collided packet (step S808).

Upon the receipt of the request, the random number generation section 508 informs the backoff time decision section 507 of the generated random number, and the priority packet judging section 509 informs the backoff time decision section 507 of the result of the examination on the priority level of the packet.

The backoff time decision section 507 calculates the backoff time based on the notice of the random number and the result of the examination of the priority level of the packet (step S809), and informs the packet transmitter 504 of the determined backoff time.

The packet transmitter 504 waits the send of packet by the notified backoff time (step S810).

Upon the completion of the standby by the backoff time in step S810, the packet transmitter 504 acquires the packet to be resent from the send buffer 505 (step S811), followed by transfer to processing in step S802.

The backoff time determined by the backoff time decision section 408, 507 in step S714 shown in FIG. 7 and step S809 shown in FIG. 8 is calculated according to the following equation:

$$\text{Backoff time} = \text{Random number from random number generation section (409, 508)} \times (1 - \text{hop count received from priority packet judging section (410, 509)}/\text{maximum hop count}) \quad (1)$$

Here the term "maximum hop count" refers to the maximum hop count which is possible in the network structure shown in FIG. 5. The value obtained by the calculation according to equation (1) is such that the backoff time decreases with increasing the hop count.

According to a preferred embodiment of the invention, the value stored in the hop recording section 304 in the packet sent from the slave station 3C is "1." On the other hand, the value stored in the hop recording section 304 in the packet sent from the relay station 2B is "2." That is, the hop count sent from the relay station 2B is larger. Therefore, this leads to a higher probability that the backoff time determined by calculation in the backoff time decision section 408 in the relay station 2B is shorter than that determined by calculation in the backoff time decision section 507 in the slave station 3C.

The backoff times determined by calculation in the backoff time decision sections 408, 507 are notified respectively to the packet transmitters 405, 504. After standby by the notified backoff times, the respective collided packets are fetched from the send buffers 406, 505, followed by resend of the packets.

In the priority data transfer method according to the first preferred embodiment of the invention, the backoff time decreases with increasing the hop count. A shorter backoff time provides a higher probability that, in resending the packet after standby by the backoff time in the packet transmitter, this packet can be sent without collision against other packet. Therefore, a packet with a larger hop count can be preferentially sent.

As is apparent from the construction of a communication system shown in FIG. 1 or 6, the packet with a larger hop count is passed through a larger number of relay stations 2 in the course of transmission. Therefore, this packet is more likely to be lost as a result of a failure of transmission in the course of the transmission. Further, the delay time and the magnitude of a variation in delay are larger. The preferential send of the packet with a larger hop count can reduce a probability that the packet is lost due to recycle-over in the course of transmission.

Further, the preferential send of the packet with a larger hop count can reduce the delay time and the magnitude of a variation in delay. Therefore, the resend according to a transport protocol in the higher rank layer, such as TCP, caused by the delay and the variation in delay can be inhibited, and the probability of the loss of the packet per se can be reduced.

(Second Preferred Embodiment)

Figure 9:
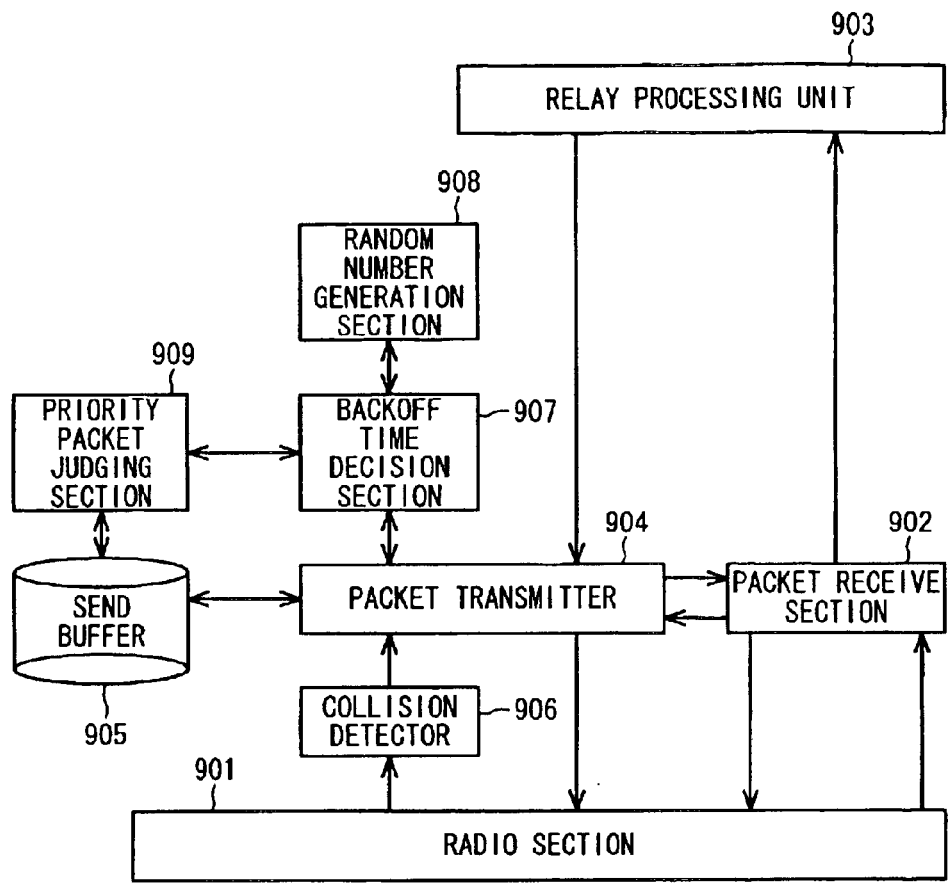
FIG. 9 is a schematic block diagram showing the construction of a relay station according to the second preferred embodiment of the invention.

FIG. 9 is a schematic block diagram showing the construction of a relay station in a second preferred embodiment of the invention. In FIG. 9, the relay station in the second preferred embodiment of the invention comprises a radio section 901, a packet receive section 902, a relay processing unit 903, a packet transmitter 904, a send buffer 905, a collision detector 906, a backoff time decision section 907, a random number generation section 908, and a priority packet judging section 909.

The second preferred embodiment is different from the first preferred embodiment in that the hop count addition section 404 is not provided.

The radio section 901 performs wireless packet send/receive through an antenna (not shown).

The packet receive section 902 is a section for receiving packets through the radio section 901.

The relay processing unit 903 functions to send the packet received by the packet receive section 902 to a next send destination.

The packet transmitter 904 asks the packet receive section 902 about higher rank state (idle line/inhibit), and, in the case of an idle state, sends the packet, sent from the relay processing unit 903, through the radio section 901 and, at the same time, stores the sent packet in the send buffer 905.

Further, the packet transmitter 904 has the function of acquiring the number of resends of the packet from the send buffer 905, adding "1" to the number of resends, and again writing the result in the send buffer 905.

The send buffer 905 is an area for temporarily storing the sent packet and the number of resends of the packet.

The collision detector 906 is a section for determining whether or not the packet sent through the radio section 901 has collided against other send packet.

The backoff time decision section 907 determines the backoff time in resend processing of the collided packet based on information from the random number generation section 908 described below and information from the priority packet judging section 909 described below.

The random number generation section 908, upon the request from the backoff time decision section 907, generates a random number in a certain predetermined range, and transfers the generated random number to the backoff time decision section 907.

The priority packet judging section 909 fetches the collided packet, from the send buffer 905, examines the priority level of the packet, and sends the result to the backoff time decision section 907.

Figure 10:
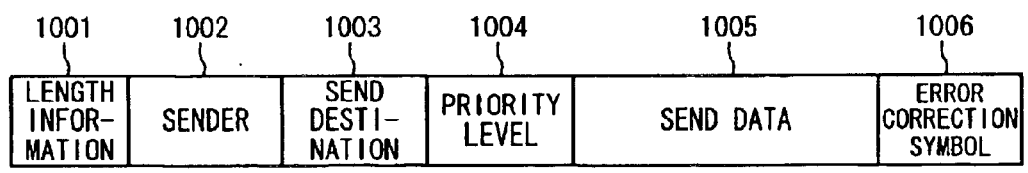
FIG. 10 is a diagram showing the construction of a leading transmission packet among a relay terminating station, a relay station, and a slave station according to the second preferred embodiment of the invention.

FIG. 10 is a diagram showing the construction of a packet used as a leading send packet among the relay terminating station, the relay stations, and the slave stations in the priority data transfer method according to the second preferred embodiment of the invention.

In FIG. 10, the leading send packet in the second preferred embodiment of the invention comprises length information 1001, a sender 1002, a send destination 1003, a priority value 1004, a send data 1005, and an error correction symbol 1006.

The length information 1001 represents the number of remaining packets to be sent. The sender 1002 is used for identifying the sender of the packet, and stores the ID of the packet sender. The send destination 1003 designates the send destination of the packet, and stores the packet send destination ID. The priority value 1004 represents the level of the required rapidity of the send of this packet, that is, priority, and is one integer value. The priority level increases with decreasing this value. The send data 1005 is a section for storing send data. The error correction symbol 1006 is a symbol for detecting and correcting a receive error of the packet.

An example of the operation of the priority data transfer method in the second preferred embodiment of the invention will be explained in conjunction with FIG. 9. In FIG. 9, as soon as the packet receive section 902 receives a packet from a relay station 2 or a slave station 3 located in a lower rank layer through the radio section 901, this packet is sent to the relay processing unit 903. Upon the receipt of the packet, the relay processing unit 903 rewrites the sender 1002 of the packet to the ID of the relay processing unit 903, writes ID of a higher rank relay station 2 or a relay terminating station 1 in the send destination 1003, transfers this packet to the packet transmitter 904. The packet transmitter 904 transfers the received packet to the radio section 901, and, in addition, stores the same packet (copy) as the sent packet in the send buffer 905.

Here when the collision detector 906 has detected that collision occurred at the time of packet transmission, this is notified to the packet transmitter 904. In order to determine the backoff time for resend, the packet transmitter 904 requests the backoff time decision section 907 for the calculation of the backoff time. The backoff time decision section 907 requests the random number generation section 908 for the generation of a random number falling within a certain value range, and receives the result.

In order to learn about the priority level of the latest sent packet, simultaneously with the receipt of the random number generated in the random number generation section 908, the backoff time decision section 907 requests the priority packet judging section 909 for the examination of the priority level of the packet, that is, the priority value 1004 in the second preferred embodiment of the invention.

The priority packet judging section 909 fetches the latest sent packet from the send buffer 905, examines the value of the priority 1004, and informs the backoff time decision section 907 of this value. The backoff time decision section 907 calculates backoff time from the random number received from the random number generation section 908 and the value of the priority received from the priority packet judging section 909, for example, according to the following equation:

Backoff time=(Value received from priority packet judging section 909/4)×(Value received from random number generation section 908) (2)

In formula (2), the backoff time is calculated by multiplying a value proportional to the value received from the priority packet judging section 909, that is, a value proportional to the priority value 1004 recorded in the collided packet, by the random number received from the random number generation section 908. Therefore, a lower value of the priority 1004 provides a shorter backoff time than usual, and thus leads to more preferential send processing.

Upon the calculation of the backoff time in the backoff time decision section 907, this value is notified to the packet transmitter 904. The packet transmitter 904 waits the send processing by the backoff time notified by the backoff time decision section 907, fetches the latest sent collided packet from the send buffer 905, and then again performs send processing through the radio section 901.

In the priority data transfer method according to the second preferred embodiment of the invention, an area for indicating the priority value 1004 is provided in the send packet, and the random number generated by the random number generation section 908 is multiplied by the priority value so that the backoff time decreases with increasing the priority level of the packet. By virtue of this, upon the collision of packets, the packet with a higher priority level can be preferentially sent.

(Third Preferred Embodiment)

The schematic construction of slave stations in the priority data transfer method according to the third preferred embodiment of the invention is the same as the construction shown in FIG. 9, and, thus, the explanation of the construction will be omitted.

Figure 11:
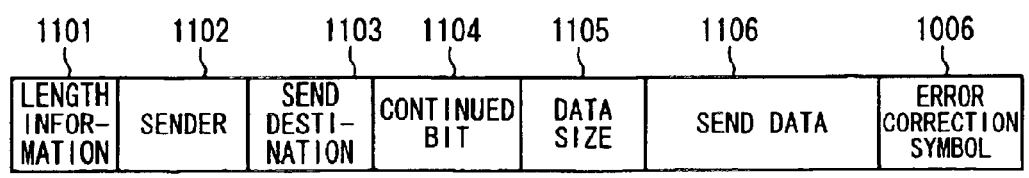
FIG. 11 is a diagram showing the construction of a leading transmission packet among a relay terminating station, a relay station, and a slave station according to a third preferred embodiment of the invention.

FIG. 11 is a diagram showing the construction of a packet used as a leading send packet among the relay terminating station, the relay stations, and the slave stations in a third preferred embodiment of the priority data transfer method according to the invention.

In FIG. 11, the leading send packet in the third preferred embodiment of the invention comprises length information 1101, a sender 1102, a send destination 1103, a continued bit 1104, a data size 1105, a send data 1106, and an error correction symbol 1107.

The length information 1101 represents the number of remaining packets to be sent. The sender 1102 is used for identifying the sender of the packet, and stores the ID of the packet sender. The send destination 1103 designates the send destination of the packet, and stores the packet send destination ID. The continued bit 1104 is a section for indicating whether or not, when data is sent in the state of being divided by fragmentation, continued data is stored in the send data 1106. The data size 1105 stores the size of data stored in the send data 1106. The send data 1106 is data to be sent. The error correction symbol 1107 is a symbol for detecting and correcting a receive error of the packet.

Next, an example of the operation of the priority data transfer method in the third preferred embodiment of the invention will be explained in conjunction with FIG. 9. In FIG. 9, as soon as the packet receive section 902 receives a packet from a relay station 2 or a slave station 3 located in a lower rank layer through the radio section 901, this packet is sent to the relay processing unit 903. Upon the receipt of the packet, the relay processing unit 903 rewrites the sender 1102 of the packet to the ID of the relay processing unit 903, writes ID of a higher rank relay station 2 or a relay terminating station 1 in the send destination 1103, transfers this packet to the packet transmitter 904. The packet transmitter 904 transfers the received packet to the radio section 901, and, in addition, stores the same packet (copy) as the sent packet in the send buffer 905.

Here when the collision detector 906 has detected that collision occurred at the time of packet transmission, this is notified to the packet transmitter 904. In order to determine the backoff time for resend, the packet transmitter 904 requests the backoff time decision section 907 for the calculation of the backoff time. The backoff time decision section 907 requests the random number generation section 908 for the generation of a random number falling within a certain value range, and receives the result.

In order to learn about the priority level of the latest sent packet, simultaneously with the receipt of the random number generated in the random number generation section 908, the backoff time decision section 907 requests the priority packet judging section 909 for the examination of the priority level of the packet, that is, the contents of the continued bit 1104 and the data size 1105 in the third preferred embodiment of the invention.

The priority packet judging section 909 fetches the latest sent packet from the send buffer 905, examines the contents of the continued bit 1104 and the data size 1105, and informs the backoff time decision section 907 of the result. The backoff time decision section 907 calculates backoff time from the random number received from the random number generation section 908 and the results of the examination of the contents received from the priority packet judging section 909, for example, according to the following equation:

Backoff time=Value received from random number generation section 908×{1−(k×data size received from priority packet judging section 909/maximum data size)}×t (3)

Here k is a parameter for regulating the priority level utilizing the data size, and is a value of 0 to less than 1, for example, about 0.5. t is a value which varies depending upon the state of the continued bit 1104 notified by the priority packet section 909. When the continued bit 1104 indicates that no continued data is present, t is 1, while when the continued bit 1104 indicates that continued data is present, t is 0<t<1. For example, t is about 0.8. Therefore, the value obtained by calculation according to equation (3) is such that the backoff time decreases with increasing the data size 1105 and that, in the case of the same data size, the backoff time is shorter when the continued bit 1104 indicates that continued data is present.

In the priority data transfer method according to the third preferred embodiment of the invention, the packet with a larger data size and, in the case of the same data size, the packet with continued data can be preferentially send. Thus, delay can be reduced in the transmission of data having a large size as a whole.

(Fourth Preferred Embodiment)

The schematic construction of slave stations in the priority data transfer method according to the fourth preferred embodiment of the invention is the same as the construction shown in FIG. 3, and, thus, the explanation of the construction will be omitted.

Figure 12:
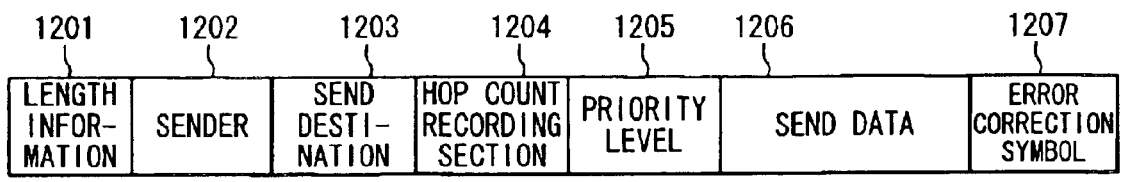
FIG. 12 is a diagram showing the construction of a leading transmission packet among a relay terminating station, a relay station, and a slave station according to a fourth preferred embodiment of the invention.
Figure 13:
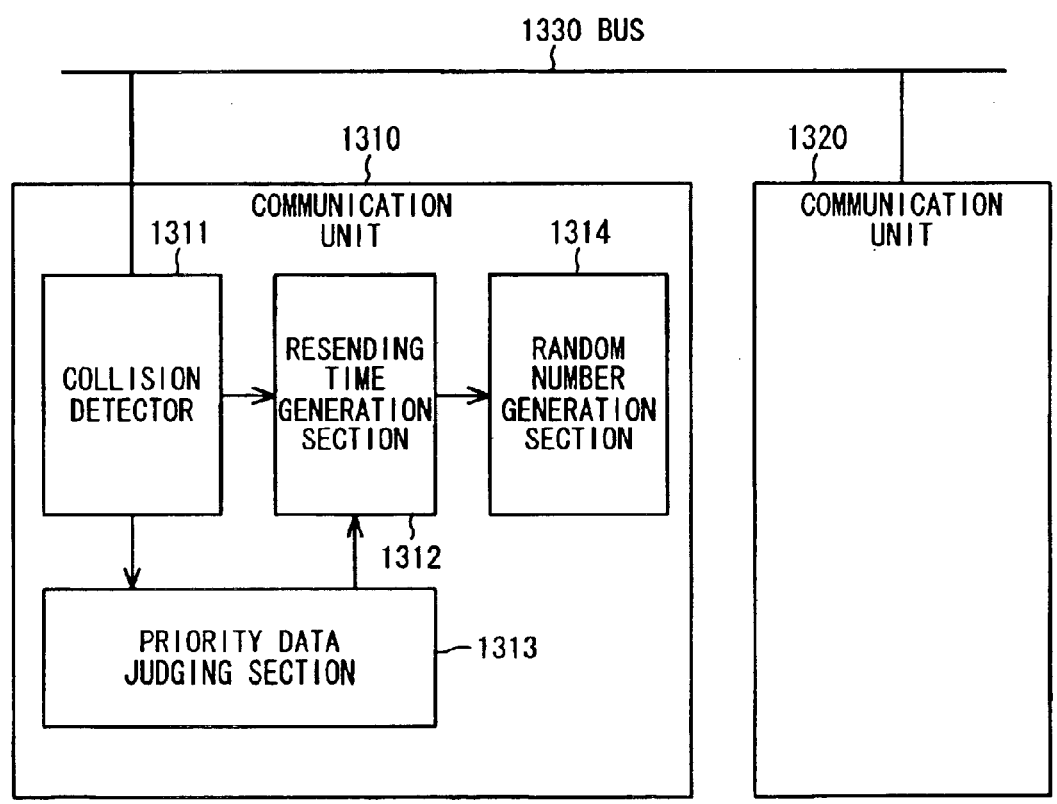
FIG. 13 is a schematic block diagram showing the construction of a conventional priority data transfer method.

FIG. 12 is a diagram showing the construction of a packet used as a leading send packet among the relay terminating station, the relay stations, and the slave stations in the priority data transfer method according to the fourth preferred embodiment of the invention.

In FIG. 12, the leading send packet in the fourth preferred embodiment of the invention comprises length information 1201, a sender 1202, a send destination 1203, a hop count recording section 1204, a priority value 1205, a send data 1206, and an error correction symbol 1207.

The length information 1201 represents the number of remaining packets to be sent. The sender 1202 is used for identifying the sender of the packet, and stores the ID of the packet sender. The send destination 1203 designates the send destination of the packet, and stores the packet send destination ID. The hop count recording section 1204 is a section for storing the hop count of this packet. When the packet is initially sent, "1" is stored. Thereafter, every time when the packet is relayed, "1" is added. The priority value 1205 represents the level of the required rapidity of the send of this packet, that is, priority, and is an integer of 1 to 4. The priority level increases with decreasing this value. The send data 1206 is data to be sent. The error correction symbol 1207 is a symbol for detecting and correcting a receive error of the packet. In this case, the backoff time is calculated according to the following equation:

Backoff time=(Value received from random number generation section 409)×(packet priority value received from priority packet judging section 410/4)×(1−hop count received from priority packet judging section 410/maximum hop count)  (4)

In the priority data transfer method according to the fourth preferred embodiment of the invention, the backoff time is calculated by multiplying the random number received from the random number generation section 409 by a value proportional to the priority value and then by a value obtained by subtracting a value proportional to the hop count from 1 (one). Therefore, a packet with a higher priority level and a packet with a larger hop count are preferentially sent. Further, even in the case of a packet with a small hop count when the packet is on a higher priority level, this packet can be preferentially sent.

In the above-described preferred embodiments of the invention, random access control (collision control) is performed by ICMA/PE. The invention, however, is not limited to this only. For example, the invention can also be applied to random access control by CSMA/CD.

As is apparent from the foregoing description, according to the priority data transfer method of the invention, setting is made so that the backoff time decreases with increasing the hop count. A shorter backoff time provides a higher probability that, in resending the packet after standby by the backoff time in the packet transmitter, this packet can be sent without collision against other packet. Therefore, a packet with a larger hop count can be preferentially sent.

Further, according to the priority data transfer method of the invention, an area for indicating the priority value is provided in the send packet, and the random number generated by the random number generation section 409 is multiplied by a value proportional to the priority value so that the backoff time decreases with increasing the priority level of the packet. By virtue of this, upon the collision of packets, the packet with a higher priority level can be preferentially sent.

Further, according to the priority data transfer method of the invention, the packet with a larger data size and, in the case of the same data size, the packet with continued data can be preferentially sent. Thus, delay can be reduced in the transmission of data having a large size as a whole.

Further, according to the priority data transfer method of the invention, the backoff time is calculated by multiplying the random number received from the random number generation section 409 by a value proportional to the priority value and then by a value obtained by subtracting a value proportional to the hop count from 1 (one). Therefore, a packet with a higher priority level and a packet with a larger hop count are preferentially sent. Further, even in the case of a packet with a small hop count, when the packet is on a higher priority level, this packet can be preferentially sent.

Further, according to the priority data transfer method of the invention, the priority data transfer control, which has hitherto been carried out by each terminal unit, is performed in a relay unit. Therefore, a load on each terminal unit can be reduced, and data transfer processing at a higher speed can be realized.

The invention has been described in detail with particular reference to preferred embodiments, but it will be understood that variations and modifications can be effected within the scope of the invention as set forth in the appended claims.

What is claimed is:

1. A priority data transfer method for a communication system using random access control, said priority data transfer method comprising the steps of:

detecting collision of a sent packet against other packet on a transmission line (a collision detection step);

upon the detection of the collision of the packet against other packet in the collision detection step, generating a random number (a random number generation step);

judging the priority level of the sent packet (a priority level judging step);

generating a delay time, which elapses until the sent packet is resent, based on the random number generated in the random number generation step and the priority level of the sent packet judged in the priority level judging step (a delay time generation step); and resending the packet after the elapse of the delay time generated in the delay time generation step;

said method further comprising the step of:

providing a hop count recording field for recording a hop count as a measure of the priority level of the sent packet; and judging the priority level of the sent packet based on the hop count recorded in the hop count recording field; and wherein, in the delay time generation step includes multiplying the random number generated in the random number generation by a value obtained by subtracting a value proportional to the hop count from 1 (one) to generate the delay time, and wherein the resending step includes preferentially resending the packet having a larger hop count recorded in the hop count recording field.

2. A priority data transfer method for a communication system using random access control, said priority data transfer method comprising the steps of:

detecting collision of a sent packet against other packet on a transmission line (a collision detection step);

upon the detection of the collision of the packet against other packet in the collision detection step, generating a random number (a random number generation step);

judging the priority level of the sent packet (a priority level judging step);

generating a delay time, which elapses until the sent packet is resent, based on the random number generated in the random number generation step and the priority level of the sent packet judged in the priority level judging step (a delay time generation step); and resending the packet after the elapse of the delay time generated in the delay time generation step, wherein:

a priority value recording field for recording a priority value as a measure of the priority level of the sent packet is provided in the sent packet; and in judging the sent packet priority level in the priority level judging step, the priority level of the sent packet is judged based on the priority value recorded in the priority value recording field; and wherein the random number generated in the random number generation step is multiplied by a value proportional to the priority value of the sent packet to generate the delay time; and the packet having a higher priority level recorded in the priority value recording field is preferentially sent.

3. The priority data transfer method according to claim 2, wherein the priority level of the sent packet increases with decreasing the priority value.

4. A priority data transfer method for a communication system using random access control, said priority data transfer method comprising the steps of:

detecting collision of a sent packet against other packet on a transmission line (a collision detection step);

upon the detection of the collision of the packet against other packet in the collision detection step, generating a random number (a random number generation step);

judging the priority level of the sent packet (a priority level judging step);

generating a delay time, which elapses until the sent packet is resent, based on the random number generated in the random number generation step and the priority level of the sent packet judged in the priority level judging step (a delay time generation step); and resending the packet after the elapse of the delay time generated in the delay time generation step, wherein:

the sent packet has a sent data length recording field for recording the length of sent data as a measure of the priority level of the sent packet, and a continued data recording field for indicating whether continued data of the sent packet is present or absent, and in judging the sent packet priority level in the priority level judging step, the priority level of the sent packet is judged based on the sent data length and the continued data wherein, in the delay time generation step, the random number generated in the random number generation step is multiplied by a value obtained by subtracting a value proportional to the data size from 1 (one), and, when the continued data is present, in addition, the obtained value is multiplied by a predetermined value to generate a delay time.

5. The priority data transfer method according to claim 4, wherein, the packet having a larger data size recorded in the sent data length recording field is preferentially sent, and when the data size is identical, the packet, wherein continued data is present in the continued data recording field, is preferentially sent.

6. A priority data transfer method for a communication system using random access control, said priority data transfer method comprising the steps of:

detecting collision of a sent packet against other packet on a transmission line (a collision detection step);

upon the detection of the collision of the packet against other packet in the collision detection step, generating a random number (a random number generation step);

judging the priority level of the sent packet (a priority level judging step);

generating a delay time, which elapses until the sent packet is resent, based on the random number generated in the random number generation step and the priority level of the sent packet judged in the priority level judging step (a delay time generation step); and resending the packet after the elapse of the delay time generated in the delay time generation step, wherein the sent packet has a hop count recording field for recording a hop count as a measure of the priority level of the sent packet, and a priority value recording field for recording a priority value as a measure of the priority level of the sent packet, and in judging the sent packet priority level in the priority level judging step, the priority level of the sent packet is judged based on the hop count and the priority value, and wherein, in the delay time generation step, the random number generated in the random number generation step is multiplied by a value proportional to the priority value and then by a value obtained by subtracting a value proportional to the hop count from 1 (one), whereby the delay time is generated, and the packet having a higher priority level and the packet having a larger hop count are preferentially sent.

7. The priority data transfer method according to claim 6, wherein the priority level of the sent packet increases with decreasing the priority value.

8. The priority data transfer method according to any one of claims 1, 2, 3, 6 or 7, wherein the communication system is a radio communication system.

9. A priority data transfer method for a communication system using random access control comprising the steps of:

detecting collision of a sent packet against other packet on a transmission line;

judging as to whether recycle of said sent packet is over or not;

making a request for determination of a back-off time for retransmitting said sent packet when said recycle of said sent packet is not over;

generating a random number upon receipt of said request;

determining a priority level of said sent packet based on a hop count of said sent packet;

generating said back-off time based on said random number and said priority level of said sent packet;

resending said sent packet after elapse of said back-off time;

wherein said sent packet having a larger hop count is preferentially sent;

wherein:

the back-off time is calculated by multiplying said random number by a value which is obtained by subtracting a division of said hop count by a maximum hop count from 1 (one).

10. The priority data transfer method according to claim 9, wherein:

said hop count is recorded in a hop count recording field of said sent packet.

11. The priority data transfer method according to claim 9, wherein:

a priority value is obtained as a measure of said priority level of said sent packet, and said back-off time is determined as a product of said random number and said priority value.

12. The priority data transfer method according to claim 11, wherein:

said priority level of said sent packet increases in accordance with decrease of said priority value.

13. The priority data transfer method according to claim 11, wherein:

a priority value recording field for recording said priority value is provided in the sent packet."

14. A priority data transfer method for a communication system using random access control comprising the steps of:

detecting collision of a sent packet against other packet on a transmission line;

judging as to whether recycle of said sent packet is over or not;

making a request for determination of a back-off time for retransmitting said sent packet when said recycle of said sent packet is not over;

generating a random number upon receipt of said request;

determining a priority level of said sent packet based on a hop count of said sent packet;

generating said back-off time based on said random number and said priority level of said sent packet;

resending said sent packet after elapse of said back-off time;

wherein said sent packet having a larger hop count is preferentially sent;

wherein the sent packet has:

a sent data length recording field for recording the length of sent data as a measure of the priority level of the sent packet, and a continued data recording field for indicating whether continued data of the sent packet is present or absent, and in determining the priority level of the sent packet, the priority level of the sent packet is judged based on the sent data length and the continued data wherein, in the back-off time generating step, the random number generated in the random number generating step is multiplied by a value obtained by subtracting a value proportional to the data size from 1 (one), and, when the continued data is present, in addition, the obtained value is multiplied by a predetermined value to generate a delay time.

15. The priority data transfer method according to claim 14, wherein the packet having a larger data size recorded in the send data length recording field is preferentially sent, and when the data size is identical, the packet, wherein continued data is present in the continued data recording field, is preferentially sent.

16. A priority data transfer method for a communication system using random access control comprising the steps of:

detecting collision of a sent packet against other packet on a transmission line;

judging as to whether recycle of said sent packet is over or not;

making a request for determination of a back-off time for retransmitting said sent packet when said recycle of said sent packet is not over;

generating a random number upon receipt of said request;

determining a priority level of said sent packet based on a hop count of said sent packet;

generating said back-off time based on said random number and said priority level of said sent packet;

resending said sent packet after elapse of said back-off time;

wherein said sent packet having a larger hop count is preferentially sent;

wherein the sent packet has:

a hop count recording field for recording a hop count as a measure of the priority level of the sent packet, and a priority value recording field for recording a priority value as a measure of the priority level of the sent packet, and in determining the priority level, the priority level of the sent packet is judged based on the hop count and the priority value.

17. The priority data transfer method as recited in claim 16, wherein, in the back-off time generating step, the random number generated in the random number generating step is multiplied by a value proportional to the priority value and then by a value obtained by subtracting a value proportional to the hop count from 1 (one), whereby the back-off time is generated, and the packet having a higher priority level and the packet having a larger hop count are preferentially sent.

18. A priority data transfer method for a communication system using random access control comprising the steps of:

detecting collision of a sent packet against other packet on a transmission line;

judging as to whether recycle of said sent packet is over or not;

making a request for determination of a back-off time for retransmitting said sent packet when said recycle of said sent packet is not over;

generating a random number upon receipt of said request;

determining a priority level of said sent packet based on a hop count of said sent packet;

generating said back-off time based on said random number and said priority level of said sent packet;

resending said sent packet after elapse of said back-off time;
  wherein said sent packet having a larger hop count is preferentially sent.
19. The priority data transfer method according to claim 18, wherein:
  said hop count is recorded in a hop count recording field of said sent packet.
20. The priority data transfer method according to claim 18, wherein:
  a priority value is obtained as a measure of said priority level of said sent packet, and said back-off time is determined as a product of said random number and said priority value.
21. The priority data transfer method according to claim 20, wherein:
  said priority level of said sent packet increases in accordance with decrease of said priority value.
22. The priority data transfer method according to claim 20, wherein:
  a priority value recording field for recording said priority value is provided in the sent packet.
23. The priority data transfer method according to claim 18, the sent packet has
  a sent data length recording field for recording the length of sent data as a measure of the priority level of the sent packet, and
  a continued data recording field for indicating whether continued data of the sent packet is present or absent, and
  in judging the sent packet priority level in the priority level judging step, the priority level of the sent packet is judged based on the sent data length and the continued data.

24. The priority data transfer method according to claim 23, wherein
  the packet having a larger data size recorded in the sent data length recording field is preferentially sent, and
  when the data size is identical, the packet, wherein continued data is present in the continued data recording field, is preferentially sent.
25. The priority data transfer method according to claim 18, wherein the send packet has
  a hop count recording field for recording a hop count as a measure of the priority level of the send packet, and
  a priority value recording field for recording a priority value as a measure of the priority level of the send packet, and
  in judging the send packet priority level in the priority level judging step, the priority level of the send packet is judged based on the hop count and the priority value.
26. The priority data transfer method according to claim 25, wherein, in the back-off time generation step,
  the random number generated in the random number generation step is multiplied by a value proportional to the priority value and then by a value obtained by subtracting a value proportional to the hop count from 1 (one), whereby the back-off time is generated, and
  the packet having a higher priority level and the packet having a larger hop count are preferentially sent.

* * * * *